(12) United States Patent
Lim (10) Patent No.: US 12,333,874 B2
(45) Date of Patent: Jun. 17, 2025

(54) APPARATUS AND METHOD FOR DETERMINING UWB MULTI-RANGING PRIORITIES

(71) Applicant: HYUNDAI MOBIS CO., LTD., Seoul (KR)

(72) Inventor: Jong Chul Lim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 42 days.

(21) Appl. No.: 18/089,276

(22) Filed: Dec. 27, 2022

(65) Prior Publication Data

US 2023/0334922 A1    Oct. 19, 2023

(30) Foreign Application Priority Data

Apr. 14, 2022    (KR) .................. 10-2022-0046551

(51) Int. Cl.
*G07C 9/00* (2020.01)
*B60R 25/24* (2013.01)
*H04B 17/318* (2015.01)

(52) U.S. Cl.
CPC ....... *G07C 9/00309* (2013.01); *H04B 17/318* (2015.01); *B60R 25/245* (2013.01); *B60R 2325/101* (2013.01); *B60R 2325/103* (2013.01); *G07C 2009/00341* (2013.01)

(58) Field of Classification Search
CPC ...... G07C 9/00309; G07C 2009/00341; H04B 17/318; B60R 25/245; B60R 2325/101; B60R 2325/103
See application file for complete search history.

(56) References Cited

U.S. PATENT DOCUMENTS

| 11,564,057 | B2 * | 1/2023 | Barton | G01S 5/0236 |
| 2019/0197896 | A1 * | 6/2019 | Bakhishev | H04B 17/27 |
| 2020/0022166 | A1 * | 1/2020 | Min | H04L 5/0053 |
| 2020/0135028 | A1 * | 4/2020 | Bakhishev | G01S 5/0289 |
| 2023/0156424 | A1 * | 5/2023 | Lee | H04W 88/06 |
| | | | | 455/456.1 |

FOREIGN PATENT DOCUMENTS

| KR | 10-2021-0137840 A | | 11/2021 |
| TW | 1812810 B | * | 8/2023 |

* cited by examiner

*Primary Examiner* — Curtis A Kuntz
*Assistant Examiner* — James E Munion
(74) *Attorney, Agent, or Firm* — NSIP Law (57) ABSTRACT

An apparatus for determining UWB multi-ranging priorities including a memory configured to store one or more instructions, a first communication system configured to perform a first communication with a plurality of digital keys, and processors configured to execute the one or more instructions to determine a respective UWB multi-ranging priority of a plurality of UWB multi-ranging priorities for each respective digital key of the plurality of digital keys based on received signal strength indicators (RSSIs) of a first plurality of communication signals of the first communication received by the first communication system for each digital key.

11 Claims, 5 Drawing Sheets

APPARATUS AND METHOD FOR DETERMINING UWB MULTI-RANGING PRIORITIES

CROSS-REFERENCE TO RELATED APPLICATION

This application claims the benefit under 35 USC § 119(a) of Korean Patent Application No. 10-2022-0046551, filed on Apr. 14, 2022, the entire disclosure of which is incorporated herein by reference for all purposes.

BACKGROUND

1. Field

The present disclosure relates to an apparatus and method for determining UWB multi-ranging priorities based on an intention to use a digital key when a vehicle performs multi-ranging including UWB ranging along with a plurality of digital keys.

2. Description of the Related Art

A smart key system is a system that enables a vehicle door to be opened or closed and a vehicle to be started up on the outside although a driver does not insert a separate key into a key box of the vehicle or does not perform a special manipulation for an operation of the vehicle.

The smart key system is operated by ranging the digital keys through wireless communication such as a UWB.

Conventionally, if a vehicle performs multi-ranging including UWB ranging along with a plurality of digital keys, the vehicle selectively performs ranging based on a priority determined by a connection order (or a criterion for each original equipment manufacturer (OEM)) of digital keys.

In this process, if ranging is simultaneously performed on two or more digital keys due to overlapped timing, one of the digital keys must be selected.

If the priority of a digital key is fixed based on a connection order as described above, the probability that a digital key having a low priority will be excluded from ranging is high, and resulting user convenience may be reduced.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, here is provided an apparatus for determining ultra wide band (UWB) multi-ranging priorities, the apparatus including a memory configured to store one or more instructions, a first communication system configured to perform a first communication with a plurality of digital keys and one or more processors configured to execute the one or more instructions to determine a respective UWB multi-ranging priority of a plurality of UWB multi-ranging priorities for each respective digital key of the plurality of digital keys based on received signal strength indicators (RSSIs) of first plurality of communication signals of the first communication received by the first communication system for the each respective digital key.

The respective communication signal may include one of a Bluetooth low energy (BLE) communication signal and a near field communication (NFC) communication signal.

The one or more processors may be configured to assign a higher UWB multi-ranging priority to a first digital key of the plurality of digital keys having a higher RSSI in the first plurality of communication signals.

The one or more processors may be configured to determine the respective UWB multi-ranging priority of the plurality of digital keys by incorporating priorities according to a basic connection order into the plurality of UWB multi-ranging priorities, wherein the priority is determined based on the RSSIs of the first plurality of communication signals when the plurality of digital keys each have an identical RSSI for of the plurality of first communication signals.

The one or more processors may be configured to determine the respective UWB multi-ranging priority for the plurality of digital keys having the identical RSSI of based on the priorities of the basic connection order.

The basic connection order may include a preset connection order based on one of a digital key criterion and a manufacturer criterion.

In another general aspect, here is provided a method of determining UWB multi-ranging priorities, the method including performing, by a first communication system, a first communication with a plurality of digital keys and determining, by a processor, UWB multi-ranging priorities for respective digital keys of the plurality of digital keys based on received signal strength indicators (RSSIs) of a plurality of communication signals received by the first communication system for each of the respective digital keys.

The plurality of communication signals may include one of a Bluetooth low energy (BLE) communication signals and a near field communication (NFC) communication signals.

In the determining of the UWB multi-ranging priorities of the respective digital keys, the method may also include assigning, by the processor, a higher UWB multi-ranging priority to first digital keys of the plurality of digital keys having a higher RSSI for the plurality of communication signals.

In the determining of the UWB multi-ranging priorities of the respective digital keys, the method may also include, determining, by the processor, UWB multi-ranging priorities for the plurality of digital keys by incorporating priorities according to a basic connection order into the UWB multi-ranging priorities, wherein the UWB multi-ranging priorities are determined based on RSSIs of the plurality of communication signals when the plurality of digital keys each have an identical RSSI for the plurality of communication signals.

In the determining of the UWB multi-ranging priorities of the respective digital keys, the method may further include, determining, by the processor, the UWB multi-ranging priorities for the plurality of digital keys having the identical RSSI of the plurality of communication signals based on the priorities of the basic connection order.

The basic connection order may include a preset connection order based on one of a digital key criterion and a manufacturer criterion.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Figure 1:
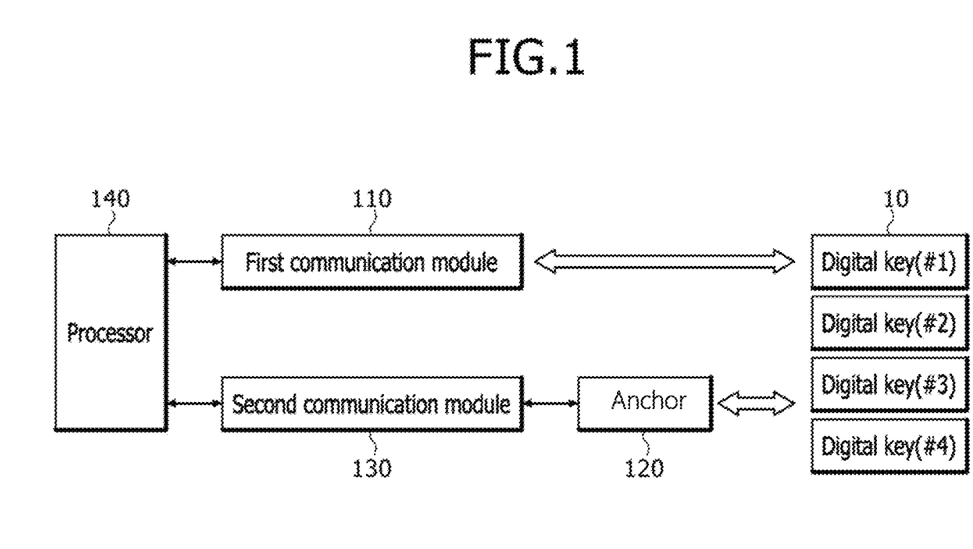
FIG. 1 is a block diagram of an apparatus for determining UWB multi-ranging priorities according to an embodiment of the present disclosure.
Figure 2:
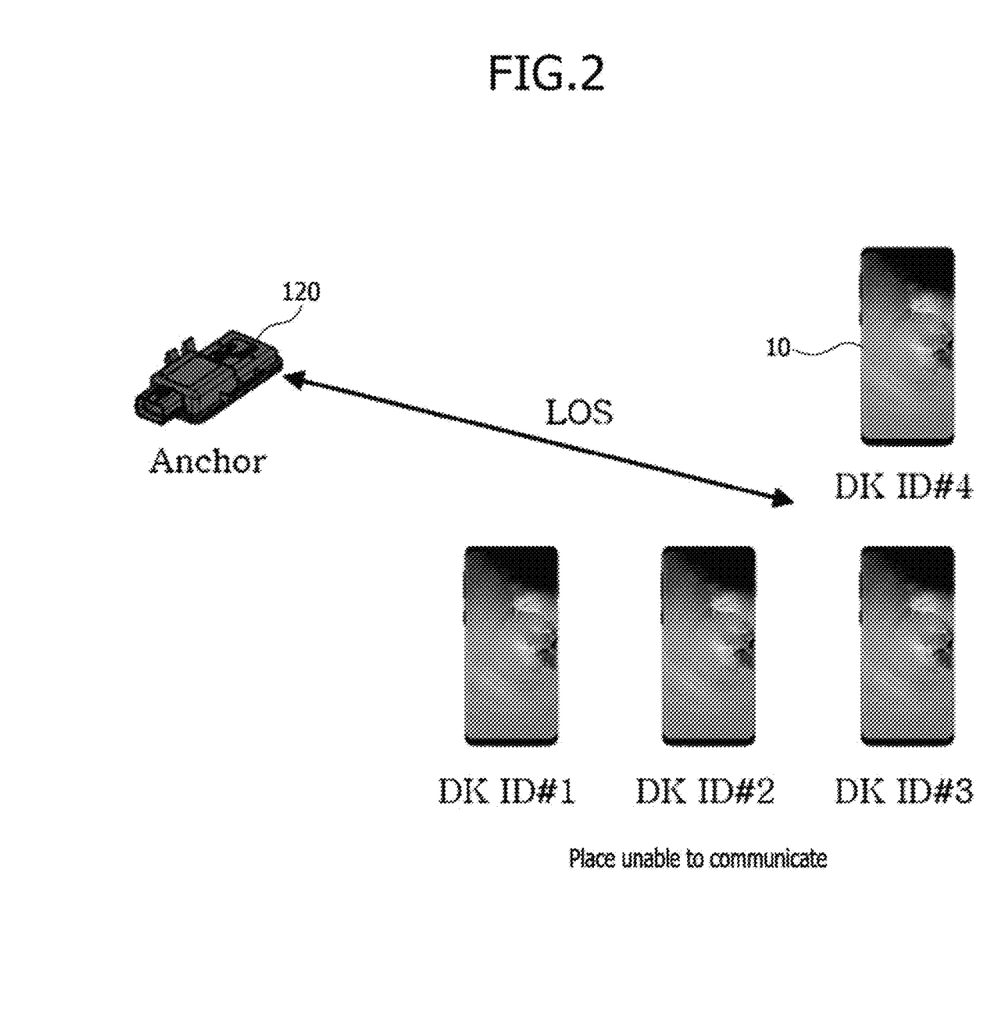
FIG. 2 is a diagram illustrating a plurality of digital keys on the basis of an anchor according to an embodiment of the present disclosure.
Figure 3:
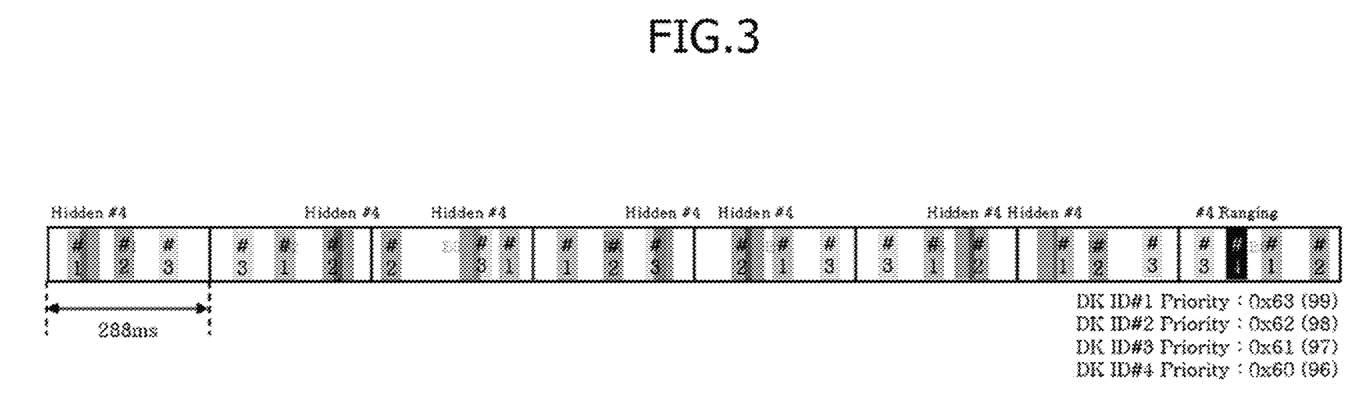
FIG. 3 is an anchor-based MAC time grid (the worst case from a point of view of DK ID #4) when a priority is simply determined based on a basic connection order.
Figure 4:
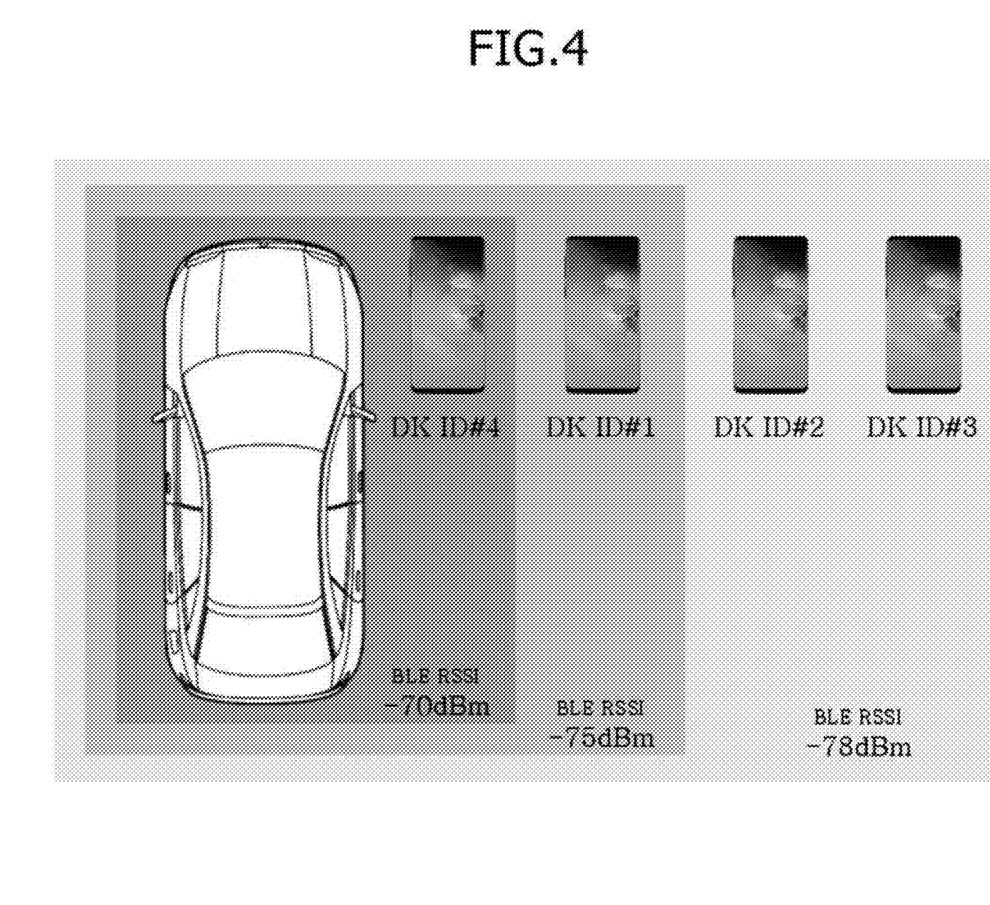
FIG. 4 is a diagram illustrating an example in which a priority is determined based on the RSSI of a BLE signal for each digital key according to an embodiment of the present disclosure.

FIG. 1 is a block diagram of an apparatus for determining UWB multi-ranging priorities according to an embodiment of the present disclosure. FIG. 2 is a diagram illustrating a plurality of digital keys on the basis of an anchor according to an embodiment of the present disclosure. FIG. 3 is an anchor-based MAC time grid (the worst case from a point of view of DK ID #4) when a priority is simply determined based on a basic connection order. FIG. 4 is a diagram illustrating an example in which a priority is determined based on the RSSI of a BLE signal for each digital key according to an embodiment of the present disclosure.

Referring to FIG. 1, the apparatus for determining UWB multi-ranging priorities according to an embodiment of the present disclosure includes a first communication module 110 (for example, a communication system), an anchor 120, a second communication module 130, and a processor 140. Communication module 100 may include, for example, a transceiver configured to transmit and receive communications.

The apparatus for determining UWB multi-ranging priorities may be installed within a vehicle, but an installation location thereof is not specifically limited.

The first communication module 110 performs first communication along with a plurality of digital keys 10 provided within a predefined ultra wide band (UWB) area.

A distance between communication subjects may be calculated based on the UWB (i.e., a bandwidth of 6 to 8 GHz and 500 MHz or higher) by multiplying a signal arrival time between the communication subjects by the speed of light by using the time of flight (ToF) technology.

The digital key 10 may be an electronic device capable of performing communication with the first communication module 110 and the second communication module 130.

The digital key 10 may perform ranging through the UWB. The UWB ranging complies with an operation sequence that is determined in an international standard, such as CCC.

Accordingly, the apparatus for determining UWB multi-ranging priorities according to an embodiment of the present disclosure may perform multi-ranging including UWB ranging along with the plurality of digital keys 10.

The digital key 10 may be a smartphone, a key fob, a personal digital assistant (PDA), a tablet PC, a wearable device, etc, but is not specifically limited.

The first communication module 110 may exchange several ranging factors (e.g., an STS index and an encryption key) for UWB communication with the digital key 10 through pre-handshaking by using a first communication method.

A Bluetooth low energy (BLE) communication method or a near field communication (NFC) communication method may be adopted as the first communication method, but the first communication method is not specifically limited.

The second communication module 130 performs communication with the anchor 120 provided within a predefined UWB area.

The anchor 120 is installed in a vehicle in a plural number, and may perform wireless communication with the second communication module 130.

The plurality of anchors 120 may perform ranging on the digital keys 10.

The processor 140 determines UWB multi-ranging priorities for the respective digital keys 10 based on the received signal strength indicators (RSSIs) of first communication signals received by the first communication module 110 for each digital key 10.

The processor 140 performs UWB multi-ranging based on a determined UWB multi-ranging priority.

More specifically, the processor 140 performs wireless communication with each of the digital keys 10 through the first communication module 110.

At this time, the first communication module 110 may exchange several ranging factors for UWB communication with the digital keys 10 through pre-handshaking by using the BLE communication method or the NFC communication method.

As the first communication module 110 performs wireless communication with the digital keys 10, the processor 140 calculates an RSSI of the first communication signal that is received from each of the digital keys 10 by using the first communication method for each digital key 10.

The processor 140 compares the RSSIs of the first communication signals calculated for each digital key 10, and aligns the RSSIs of the first communication signals in order of higher RSSI.

The processor 140 assigns a higher UWB multi-ranging priority to the digital key 10 having a higher RSSI of the first communication signal.

Furthermore, if the RSSI of the first communication signal is calculated, the RSSIs of the first communication signals may be the same.

If RSSIs of the first communication signals received from the respective digital keys 10 are the same, the processor 140 may finally determine UWB multi-ranging priorities of the digital keys 10 by incorporating a preset basic connection order into the UWB multi-ranging priorities determined based on the RSSIs of the first communication signals.

In this case, the basic connection order is a connection order that is set based on a digital key criterion or a manufacturer criterion.

Accordingly, the processor 140 may determine UWB multi-ranging priorities based on priorities that are determined based on the basic connection order set based on the digital key criterion or the manufacturer criterion.

Referring to FIGS. 2 and 3, as the number of digital keys 10 to be ranged is increased, the digital key 10 has a lower priority. Accordingly, there is a possibility that the digital key 10 having the lowest priority rarely operates ("hidden session") according to circumstances.

As the digital key 10 has a higher priority, a priority value of the digital key 10 becomes higher. Accordingly, a digital key DK ID #1 (0×63(99)), a digital key DK ID #2 (0×62(98)), a digital key DK ID # (0×61(97)), and a digital key DK ID #4(0×60(96)) priority values of which become relatively smaller sequentially have lower priorities.

In this case, the digital key DK #4 having the lowest priority does not perform ranging if the ranging time of the digital key DK #4 overlaps those of other digital keys 10. Accordingly, there is a good probability that the digital key DK #4 may become a hidden session.

Although the digital key DK #4 having the lowest priority consistently performs hopping, there is a good probability that the digital key DK #4 may become a hidden session because other digital keys 10 also perform hopping.

For example, if a user who owns the digital key DK #4 attempts to open a door handle of a vehicle for a passive entry, the digital key DK #4 is simply present nearby, and may not attempt ranging itself due to the digital key DK #1, the digital key DK #2, and the digital key DK #3 having relatively higher priorities. Accordingly, passive entry operation delay or an operation failure may be caused because the location of the digital key DK #4 is not identified.

Accordingly, as described above, the processor 140 calculates RSSIs of the first communication signals received from the digital keys 10, respectively, by using the BLE communication method or the NFC communication method, and assigns a higher UWB multi-ranging priority to the digital key 10 having a higher RSSI of the first communication signal.

Referring to FIG. 4, the RSSI of the first communication signal received from the digital key DK ID #4 is −70 dBm, the RSSI of the first communication signal received from the digital key DK ID #1 is −75 dBm, and the RSSIs of the first communication signals received from the digital key DK ID #2 and the digital key DK ID #3 are −78 dBm.

In this case, the processor 140 determines UWB multi-ranging priorities in order of the digital key DK ID #4, the digital key DK ID #1, and the digital key DK ID #2 and the digital key DK ID #3 in order of smaller RSSIs of the first communication signals.

The first communication signals received from the digital key DK ID #2 and the digital key DK ID #3 have the same RSSIs of −78 dBm.

In this case, the processor 140 may finally determine UWB multi-ranging priorities by incorporating priorities according to a connection order determined based on a digital key criterion or a manufacturer criterion into the UWB multi-ranging priorities that have been determined based on the RSSIs of the first communication signals.

That is, since priorities determined based on the basic connection order are incorporated into a plurality of digital keys 10 having the same RSSI of the first communication signal, a higher priority is assigned to the digital key 10 having a higher priority determined based on the basic connection order.

TABLE 1

Assignment of priorities when RSSIs are the same

| DK ID | Priorities based on Basic connection order | RSSI | Final priority |
|---|---|---|---|
| #1 | 99 | −75 | 24 (second class) |
| #2 | 98 | −78 | 20 (third class) |
| #3 | 97 | −78 | 19 (fourth class) |
| #4 | 96 | −70 | 26 (first class) |

Referring to Table 1, the first communication signals received from the digital key DK ID #2 and the digital key DK ID #3 have the same RSSI of −78 dBm.

However, the digital key DK ID #2 has a higher priority based on the basic connection order than the digital key DK ID #3.

Accordingly, the final priority of the digital key DK ID #2 is higher than that of the digital key DK ID #3.

Conclusionally, UWB multi-ranging priorities of the digital key DK ID #4, the digital key DK ID #1, the digital key DK ID #2, and the digital key DK ID #3 are sequentially determined.

As UWB multi-ranging priorities of the digital keys are determined as described above, the processor 140 performs UWB multi-ranging based on the UWB multi-ranging priorities by controlling the second communication module 130.

Hereinafter, a method of determining UWB multi-ranging priorities according to an embodiment of the present disclosure is described in detail with reference to FIG. 5.

Figure 5:
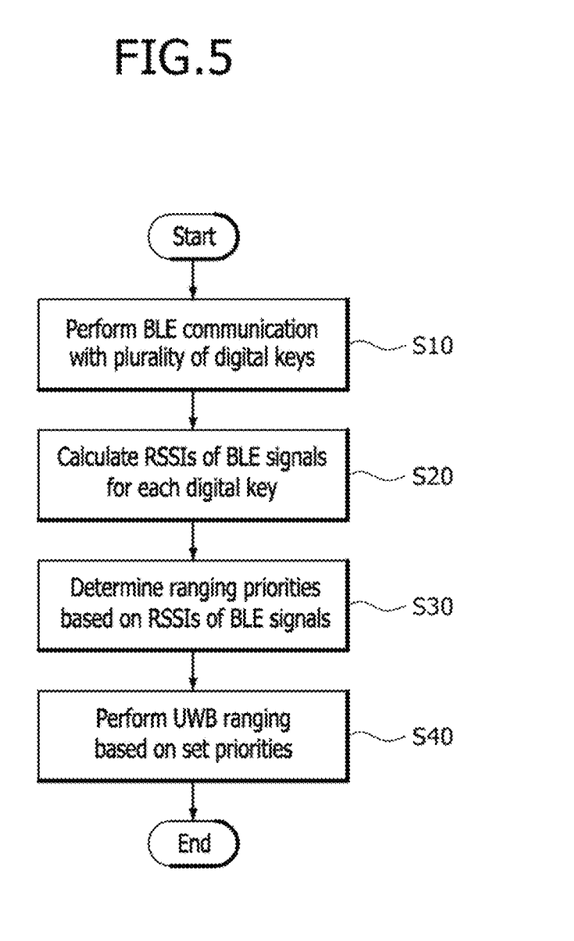
FIG. 5 is a flowchart of a method of determining UWB multi-ranging priorities according to an embodiment of the present disclosure.

FIG. 5 is a flowchart of a method of determining UWB multi-ranging priorities according to an embodiment of the present disclosure.

Referring to FIG. 5, first, the processor 140 performs wireless communication with each of the digital keys 10 through the first communication module 110 (S10).

In this case, the first communication module 110 may exchange several ranging factors for UWB communication, which have been determined in a standard association, with the digital keys 10 through pre-handshaking by using the first communication method.

As the first communication module 110 performs the wireless communication with the digital keys 10, the processor 140 calculates RSSIs of the first communication signals received from the digital keys 10, respectively, by using the first communication method for each digital key 10 (S20).

The processor 140 compares the RSSIs of the first communication signals calculated for each digital key 10, aligns the RSSIs of the first communication signals in order of higher RSSI, and determines UWB multi-ranging priorities of the digital keys 10 based on the RSSIs (S30).

In this case, the processor 140 may assign a higher UWB multi-ranging priority to the digital key 10 having a higher RSSI of the first communication signal.

Furthermore, if RSSIs of the first communication signals received from the respective digital keys 10 are the same, the processor 140 may determine UWB multi-ranging priorities of the digital keys 10 by incorporating priorities determined based on a basic connection order into the UWB multi-ranging priorities determined based on the RSSIs of the first communication signals.

As priorities determined based on the basic connection order are incorporated into the plurality of digital keys 10 having the same RSSI of the first communication signal, a higher priority is assigned to the digital key 10 having a higher priority determined based on the basic connection order.

As the UWB multi-ranging priorities of the digital keys 10 are determined as described above, the processor 140 performs UWB multi-ranging based on the UWB multi-ranging priorities by controlling the second communication module 130 (S40).

As described above, the apparatus and method for determining UWB multi-ranging priorities according to an embodiment of the present disclosure determine multi-ranging priorities based on the RSSIs of BLE signals that play a role as a trigger for UWB ranging when a vehicle performs multi-ranging including UWB ranging along with the plurality of digital keys 10.

Furthermore, the apparatus and method for determining UWB multi-ranging priorities according to an embodiment of the present disclosure can improve a passive entry/start operation time and increase user convenience because the digital key 10 having high intention to use is first ranged.

Various embodiments of the present disclosure do not list all available combinations but are for describing a representative aspect of the present disclosure, and descriptions of various embodiments may be applied independently or may be applied through a combination of two or more.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for determining ultra wide band (UWB) multi-ranging priorities, the apparatus comprising:
a memory configured to store one or more instructions;
a first communication system configured to perform a first communication with a plurality of digital keys; and
one or more processors configured to execute the one or more instructions to determine a respective UWB multi-ranging priority of a plurality of UWB multi-ranging priorities for each respective digital key of the plurality of digital keys based on received signal strength indicators (RSSIs) of a first plurality of communication signals of the first communication received by the first communication system for the each respective digital key, wherein the UWB multi-ranging priority is set for each digital key based only on the RSSI of the first communication signals of each respective digital key,
wherein the one or more processors are configured to determine the respective UWB multi-ranging priority of the plurality of digital keys by incorporating priorities according to a basic connection order into the plurality of UWB multi-ranging priorities, wherein the priority is determined based on the RSSIs of the first priority of communication signals when the plurality of digital keys each have an identical RSSI for the plurality of first communication signals.

2. The apparatus of claim 1, wherein the respective communication signal comprises one of a Bluetooth low energy (BLE) communication signal and a near field communication (NFC) communication signal.

3. The apparatus of claim 1, wherein the one or more processors are configured to assign a higher UWB multi-ranging priority to a first digital key of the plurality of digital keys having a higher RSSI in the first plurality of communication signals.

4. The apparatus of claim 1, wherein the one or more processors are configured to determine the respective UWB multi-ranging priority for the plurality of a digital keys having the identical RSSI based on the priorities of the basic connection order.

5. The apparatus of claim 1, wherein the basic connection order comprises a preset connection order based on one of a digital key criterion and a manufacturer criterion.

6. A method of determining UWB multi-ranging priorities, the method comprising:
performing, by a first communication system, a first communication with a plurality of digital keys; and
determining, by a processor, UWB multi-ranging priorities for respective digital keys of the plurality of digital keys based soley on received signal strength indicators (RSSIs) of a plurality of communication signals received by the first communication system for each of the respective digital keys,
wherein, in the determining of the UWB multi-ranging priorities of the respective digital keys, the method further comprises, determining, by the processor, UWB nulti-ranging priorities for the plurality of digital keys by incorporating priorities according to basic connection order into the UWB multi-ranging priorities, wherein the UWB multi-ranging priorities are determined based on RSSIs of the plurality of communication signals when the plurality of digital keys each have an identical RSSI for the plurality of communication signals.

7. The method of claim 6, wherein the plurality of communication signals comprises one of a Bluetooth low energy (BLE) communication signals and a near field communication (NFC) communication signals.

8. The method of claim 6, wherein, in the determining of the UWB multi-ranging priorities of the respective digital keys, the method further comprises assigning, by the processor, a higher UWB multi-ranging priority to first digital keys of the plurality of digital keys having a higher RSSI for the plurality of communication signals.

9. The method of claim 6, wherein, in the determining of the UWB multi-ranging priorities of the respective digital keys, the method further comprises, determining, by the processor, the UWB multi-ranging priorities for the plurality of digital keys having the identical RSSI of the plurality of communication signals based on the priorities of the basic connection order.

10. The method of claim 6, wherein the basic connection order comprises a preset connection order based on one of a digital key criterion and a manufacturer criterion.

11. An apparatus for determining ultra wide band (UWB) multi-ranging priorities, the apparatus comprising:
a memory configured to store one or more instructions;
one or more processors configured to execute the one or more instructions to determine a respective UWB multi-ranging priority of a plurality of UWB multi-ranging priorities for each respective digital key of the plurality of digital keys based on received signal strength indicators (RSSIs) of a first plurality of communication signals of a first communication received for the each respective digital key, wherein the one or more processors are configured to determine the respective UWB multi-ranging priority of the plurality of digital keys by incorporating priorities according to a basic connection order into the plurality of UWB multi-ranging priorities, wherein the priority is determined based on the RSSIs of the first plurality of communication signals when the plurality of digital keys each have an identical RSSI for of the plurality of first communication signals, wherein, in the determining of the UWB multi ranging priorities of the respective digital keys.

* * * * *